(12) United States Patent
Unton et al.

(10) Patent No.: US 11,959,669 B2
(45) Date of Patent: Apr. 16, 2024

(54) BIMODAL COOLING SYSTEM

(71) Applicant: Rolls-Royce North American Technologies Inc., Indianapolis, IN (US)

(72) Inventors: Timothy Unton, Indianapolis, IN (US); Douglas J. Snyder, Indianapolis, IN (US); Christopher Banham, Indianapolis, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 3 days.

(21) Appl. No.: 17/313,392

(22) Filed: May 6, 2021

(65) Prior Publication Data
US 2022/0357082 A1    Nov. 10, 2022

(51) Int. Cl.
*F25B 41/22* (2021.01)
*F25B 25/00* (2006.01)
(Continued)

(52) U.S. Cl.
CPC ............ *F25B 25/005* (2013.01); *F25B 41/22* (2021.01); *F25B 49/027* (2013.01);
(Continued)

(58) Field of Classification Search
CPC ...... F25B 25/005; F25B 41/22; F25B 49/027; F25B 2600/026; F25B 2600/0261;
(Continued)

(56) References Cited

U.S. PATENT DOCUMENTS 3,807,192 A * 4/1974 Porter ................ F25B 41/20
62/197
5,477,700 A * 12/1995 Iio ................ B60H 1/00392
62/196.4
(Continued)

FOREIGN PATENT DOCUMENTS

CN    208751092 U    4/2019
CN    209744618 U    12/2019
(Continued)

OTHER PUBLICATIONS

O'Meallie, et al., U.S. Appl. No. 17/070,006, filed Oct. 14, 2020, pp. 1-22, U.S. Patent and Trademark Office, Alexandria, VA.
(Continued)

*Primary Examiner* — Jonathan Bradford
(74) *Attorney, Agent, or Firm* — Shumaker & Sieffert, P.A.

(57) ABSTRACT

Cooling systems and methods of operation are provided. The cooling system may include a two-phase pumped loop (TPPL). The two-phase pumped loop may include, a receiver, a pump downstream from the receiver, a heat load downstream from the pump, a TPPL tee downstream from the heat load, a TPPL check valve downstream from the TPPL tee, and a heat exchanger downstream from the TPPL check valve and upstream from the receiver. The cooling system may further include a vapor cycle system (VCS) loop. The vapor cycle system loop may include the receiver, a compressor downstream from a vapor outlet of the receiver, a compressor check valve downstream from the compressor and upstream of the heat exchanger, the heat exchanger, and the heat load downstream from a liquid outlet of the receiver.

20 Claims, 3 Drawing Sheets

(51) Int. Cl.
    *F25B 49/02*     (2006.01)
    *B64D 13/06*     (2006.01)

(52) U.S. Cl.
    CPC .............. *B64D 2013/064* (2013.01); *F25B 2600/2501* (2013.01); *F25B 2600/2513* (2013.01); *F25B 2600/2515* (2013.01); *F25B 2600/2523* (2013.01); *F25B 2700/191* (2013.01)

(58) Field of Classification Search
    CPC ...... F25B 2600/2513; F25B 2600/2501; F25B 2600/2515; F25B 2600/2523; F25B 2700/191
    See application file for complete search history.

(56) References Cited

U.S. PATENT DOCUMENTS

| | | | |
|---|---|---|---|
| 8,424,326 B2 | 4/2013 | Mitra et al. | |
| 8,671,703 B2 | 3/2014 | Mitra et al. | |
| 8,671,706 B2 | 3/2014 | Chin et al. | |
| 9,038,404 B2* | 5/2015 | Judge | F25B 25/00 62/175 |
| 9,068,766 B2 | 6/2015 | Tamaki et al. | |
| 9,200,820 B2 | 12/2015 | Okazaki et al. | |
| 10,088,202 B2 | 10/2018 | Huff et al. | |
| 10,906,150 B2 | 2/2021 | Jansen et al. | |
| 10,921,042 B2 | 2/2021 | Donovan et al. | |
| 2004/0244394 A1* | 12/2004 | Nakayama | F25B 9/008 62/509 |
| 2016/0305697 A1 | 10/2016 | Kopko et al. | |
| 2020/0039811 A1* | 2/2020 | Werlen | F25B 9/008 |
| 2020/0326114 A1 | 10/2020 | Donovan et al. | |

FOREIGN PATENT DOCUMENTS

| | | |
|---|---|---|
| CN | 110848852 A | 2/2020 |
| EP | 2 873 934 A1 | 5/2015 |
| EP | 2 933 583 A1 | 10/2015 |
| EP | 3 553 420 A2 | 10/2019 |
| JP | 2003-285634 | 10/2003 |
| WO | WO 2020/240845 A1 | 12/2020 |

OTHER PUBLICATIONS

French Office Action, dated Oct. 17, 2023, pp. 1-9, French Patent Application FR2204228, French National Institute of Industrial Property, Courbevoie, France.

\* cited by examiner

BIMODAL COOLING SYSTEM

TECHNICAL FIELD

This disclosure relates to cooling and, in particular, to cooling using a combination of a pumped two-phase cooling loop and a vapor cycle system loop.

BACKGROUND

Present cooling systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
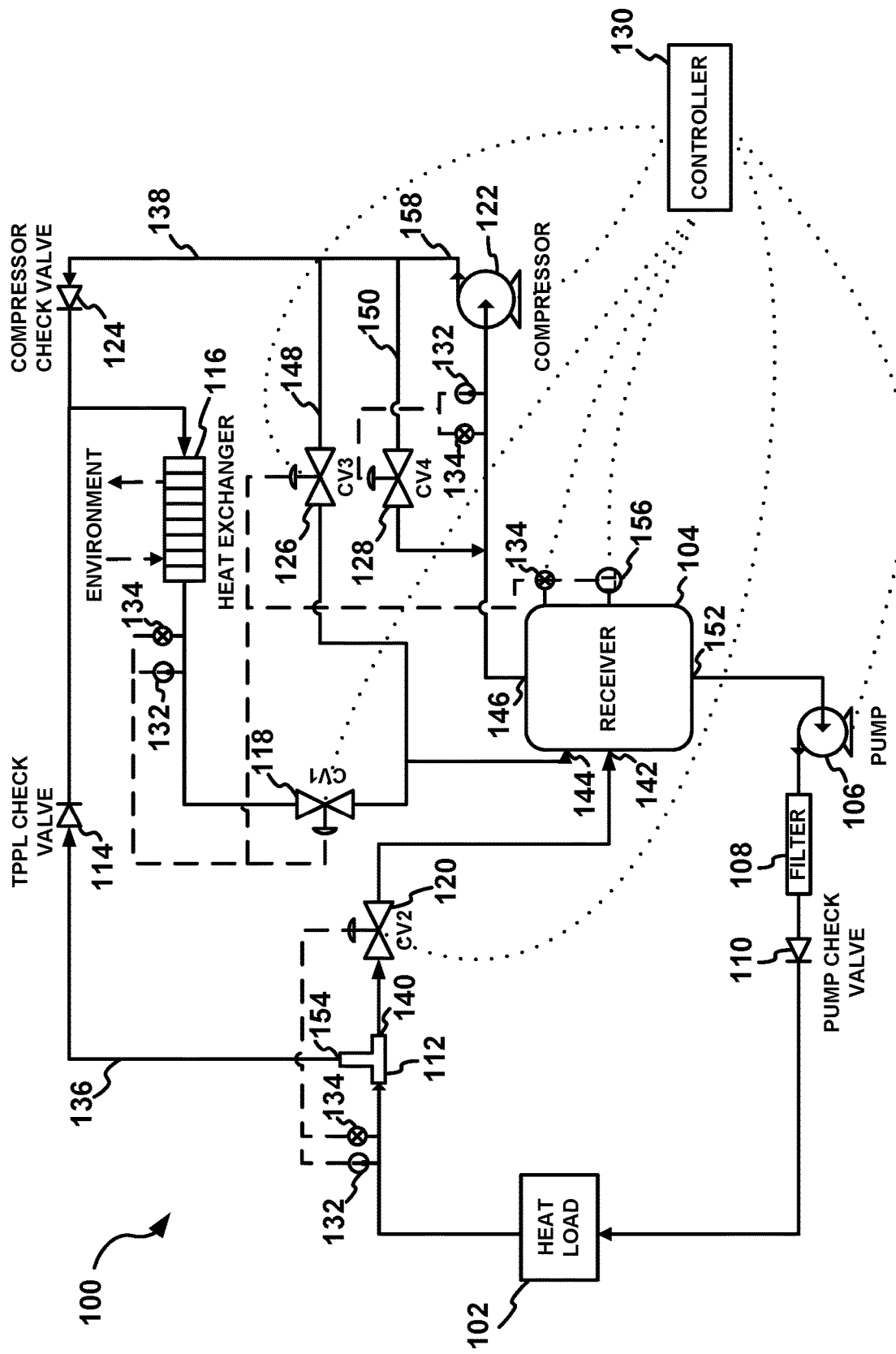
FIG. 1 illustrates an example of a bimodal cooling system.

A cooling system is provided. The cooling system may comprise a two-phase pumped loop (TPPL). The two-phase pumped loop may include, a receiver (also referred to as a liquid receiver), a pump downstream from the receiver, a heat load downstream from the pump, a TPPL tee downstream from the heat load, a TPPL check valve downstream from a first outlet of the TPPL tee, and a heat exchanger downstream from the TPPL check valve and upstream from the receiver. The cooling system may further include a vapor cycle system (VCS) loop. The VCS may operate via a vapor compressor and/or vapor compression. The vapor cycle system loop may include the receiver, a compressor downstream from a vapor outlet the receiver, a compressor check valve downstream from the compressor and upstream of the heat exchanger, the heat exchanger, and the heat load downstream from the pump and/or a liquid outlet of the receiver.

The two-phase pumped loop may be configured to operate in a TPPL mode in which a cooling fluid flows through the two-phase pumped loop due to the TPPL check valve being open and the compressor check valve being closed. The vapor cycle system loop may be configured to operate in a VCS mode in which the cooling fluid flows through the vapor cycle system loop due to the TPPL check valve being closed and the compressor check valve being open. Cooling fluid may flow through the TPPL portion of the system in VCS mode, but cooling fluid may stop flowing from the TPPL check valve to the heat exchanger.

A method of cooling a heat load is provided. The method of cooling the heat load may comprise directing a cooling fluid through a two-phase pumped loop due to a TPPL check valve being open and a compressor check valve being closed in a TPPL mode. The two phase pumped loop may include the receiver, the pump, the heat load downstream from the receiver, the TPPL tee downstream from the heat load, the TPPL check valve downstream from the TPPL tee, and the heat exchanger downstream from the TPPL check valve and upstream from the receiver. The method may further comprise directing the cooling fluid through a vapor cycle system (VCS) loop due to the TPPL check valve being closed and the compressor check valve being open in a VCS mode. The vapor cycle system loop may include the receiver, a compressor downstream from a vapor outlet of the receiver, the compressor check valve downstream from the compressor and upstream of the heat exchanger, the heat exchanger, and the heat load downstream from the pump and/or a liquid outlet of the receiver.

One interesting feature of the systems and methods described below may be the ability of the system to switch between a VCS loop and a two-phase pumped loop, which allows for greater efficiency and/or smaller system components. For example, when the cooling system operates at a relatively high altitude, for example, above 30,000 feet, the ambient air temperature may be significantly lower than, for example, on the ground. In such situations, the difference in temperature between the ambient air and the heat load to be cooled (Δt) may be relatively high and sufficiently large enough that operation of the VCS loop is not needed for cooling. Additionally or alternatively, when the heat load is operating at a relatively low capacity, such as during a cruise when disposed in an aircraft, cooling demands may be relatively low. In such situations, the cooling system may operate as a two-phase pumped loop, which is more efficient, draws less energy, and has less drag when, for example, the cooling system is disposed on an aircraft. When less cooling capacity is needed or when Δt is relatively large, operation as a two-phase pumped loop may use less power than operation of the VCS loop in a turndown condition.

Alternatively, or in addition, another interesting feature of the systems and methods described below may be that, in situations where increased cooling capacity may be needed, such as when the heat load is operating at high capacity, for example during takeoff, and/or when Δt is relatively low, the cooling system may switch from the two-phase pumped loop and operate as a VCS loop. Because the system may use the VCS loop when increased cooling is needed, the heat exchanger may be smaller than it otherwise would need to be if the system could only operate as a two-phase pumped loop. Only having a two-phase pumped loop would require a larger heat exchanger to adequately cool the heat load during high capacity operations or when Δt is relatively small. This also reduces drag because the heat exchanger may protrude into the free stream when, for example, the cooling system is disposed on an aircraft. A smaller heat exchanger creates less drag than a larger heat exchanger, therefore increasing the fuel efficiency of the aircraft.

Additionally or alternative, another advantage is that the system may switch between TPPL mode and VCS mode in order to maintain sufficient cooling based on variations of the environment to which the heat is rejected, such as variations due to the seasons and/or the time of day (for example, day or night). The VCS loop may enable sub-ambient cooling for times when the ambient temperature to which heat is rejected may exceeds the desired coolant delivery temperature. Both aircraft and other mission critical systems may require a continuous supply of coolant during operations, so the ability to transition modes while operating and continuously supplying coolant is advantageous.

FIG. 1 illustrates an example of a bimodal cooling system 100 to cool a heat load 102. The illustrated example of the system 100 includes a receiver 104, a pump 106, a filter 108, a pump check valve 110, the heat load 102, a TPPL tee 112, a two-phase pumped loop (TPPL) check valve 114, a heat exchanger 116, a first control valve (CV1) 118, a second control valve (CV2) 120, a compressor 122, a compressor check valve 124, a third control valve (CV3) 126, a fourth control valve (CV4) 128, a controller 130, one or more temperature sensors 132, one or more pressure sensors 134, one or more liquid level sensors 156, a two-phase pumped loop (TPPL) 136, and a vapor cycle system (VCS) loop 138.

The TPPL 36 may include the receiver 104, the pump 106, the filter 108, the pump check valve 110, the heat load 102, the TPPL tee 112, the TPPL check valve 114, the heat exchanger 116, the first control valve 118, one or more of the temperature sensors 132, one or more liquid level sensors 156, and one or more of the pressure sensors 134. The pump 106 may be downstream from a liquid outlet 152 of the receiver 104 and the filter 108 may be downstream from the pump 106. The pump check valve 110 may be downstream of the filter 108 and pump 106 and upstream of the heat load 102. The heat load 102 may be downstream from the receiver 104, the pump 106, the filter 108, and the pump check valve 110.

The TPPL tee 112 may be downstream from the heat load 102 and upstream of the heat exchanger 116 and the receiver 104. For example, a first outlet 154 of the TPPL tee 112 may be in fluid communication with an inlet of the heat exchanger 116, and a second outlet 140 of the TPPL tee 112 may be in fluid communication with a first inlet 142 of the receiver 104. The TPPL check valve 114 may be disposed downstream of the first outlet 154 of the TPPL tee 112 between the TPPL tee 112 and the heat exchanger 116. The heat exchanger 116 may be downstream of the TPPL tee 112 and the TPPL check valve 114 and upstream of the receiver 104. The first control valve 118 may be disposed downstream of the heat exchanger 116, between the heat exchanger 116 and a second inlet 144 of the receiver 104. The second control valve 120 may be disposed downstream of the second outlet 140 of the TPPL tee 112, between the TPPL tee 112 and the first inlet 142 of the receiver 104.

The VCS loop 138 may include the receiver 104, the compressor 122, the compressor check valve 124, the heat exchanger 116, the first control valve 118, the third control valve 126, the fourth control valve 128, one or more of the temperature sensors 132, one or more liquid level sensors 156, and/or one or more of the pressure sensors 134. The compressor 122 may be downstream of and in fluid communication with a vapor outlet 146 of the receiver 104. The compressor check valve 124 may be disposed downstream of the compressor 122 and upstream of the heat exchanger 116.

The third control valve 126 may be disposed downstream of the compressor 122 and upstream of the receiver 104. The third control valve may be disposed on a bypass line 148 that extends from downstream of the compressor 122 to upstream of the second inlet 144 the receiver 104. The fourth control valve 128 may be disposed downstream of the compressor 122 on a recycle line 150. The recycle line 150 may extend from downstream of the outlet of the compressor 122 back upstream to between the vapor outlet 146 of the receiver 104 and the inlet of the compressor 122. The bypass line 148 and the recycle line 150 may each split off from a compressor discharge line 158 extending between the compressor 122 and the heat exchanger 116.

The pressure sensors 134, liquid level sensors 156, and/or temperature sensors 132 may be disposed throughout the bimodal cooling system 100. For example a pressure sensor 134 and/or a temperature sensor 132 may be disposed upstream of the TPPL tee 112 and be in communication with the second control valve 120. Additionally or alternatively, a pressure sensor 134 and/or a temperature sensor 132 may be disposed downstream of the heat exchanger 116 and be in communication with the first control valve 118 and/or the third control valve 126. Additionally or alternatively, a pressure sensor 134 and/or a temperature sensor 132 may be disposed upstream of the compressor 122 and be in communication with the fourth control valve 128. Additionally or alternatively, a pressure sensor 134, a liquid level sensor 156, and/or a temperature sensor 132 may be disposed on the receiver 104 and may be in communication with the third control valve 126.

Additionally or alternatively, the pressure sensors 134, the temperature sensors 132, the first control valve 118, the second control valve 120, the third control valve 126, and/or the fourth control valve 128 may be in communication with the controller 130. The controller 130 may, for example, direct the valve 118, 120, 126, 128 positions. The system 100 may operate with distributed control (where each valve 118, 120, 126, 128 has its own control algorithm) and/or with coordinated control (where the sensors 132, 134, 156 feed into the controller 130 and the controller 130 sends commands to each valve 118, 120, 126, 128). For clarity, FIGS. 1 and 2 do not have dotted lines drawn to every sensor 132, 134, 156 and/or control valve 120, 118, 126, 128. However, it should be understood that some and/or all of the sensors 132, 134, 156 and/or control valves 120, 118, 126, 128 may be in communication with the controller 130. Additionally or alternatively, the controller 130 may include a plurality of controllers. For example, the sensors 132, 134, 156 and/or control valves 120, 118, 126, 128 may be controlled by a combination of multiple controllers, wherein some or all of the sensors 132, 134, 156 and/or control valves 120, 118, 126, 128 may be controlled by separate controllers. The receiver 104 may be any vessel capable of receiving and storing a cooling fluid. The cooling fluid may be, for example, a liquid, vapor, and/or a liquid-vapor mixture. For example, the cooling fluid may be a two-phase cooling fluid, for example, a two-phase refrigerant. Additionally or alternatively, the receiver 104 may be a liquid-vapor separator, for example, the receiver 104 may be any vessel capable of receiving the cooling fluid, separating the cooling fluid into a liquid and a vapor, and storing the liquid and vapor in separate portions of the receiver 104. The receiver 104 may be, for example, a tank.

The receiver 104 may, for example, separate the cooling fluid using gravity. For example the cooling fluid may enter the receiver 104 from one or more inlets, a liquid component of the cooling fluid may be pulled towards the bottom of the receiver 104 by gravity, and a vapor component of the cooling fluid may stay towards the top of the receiver 104. The receiver 104 may have internal devices or features to further encourage liquid-vapor separation.

The receiver 104 may have one or more inlets, for example the first inlet 142 and/or the second inlet 144, to receive the cooling fluid from one or more components of the bimodal cooling system 100. For example, the receiver 104 may have one or more inlets on the top and/or side of the receiver 104. For example, the first inlet 142 may be disposed on the side of the receiver 104, and the second inlet 144 may be disposed on the side of the receiver 104 above the first inlet 142. Additionally or alternatively, the second inlet 144 may be at the same height as the first inlet 142, but at a different circumferential position than the first inlet 142, for example when the receiver 104 is cylindrical. Additionally or alternatively, the first inlet 142 and/or the second inlet 144 may be disposed on the top of the receiver 104 opposite the bottom.

The receiver 104 may have one or more outlets, for example the liquid outlet 152 and/or the vapor outlet 146, for providing the cooling fluid to one or more components of the bimodal cooling system 100. For example, the liquid outlet 152 may be disposed on the bottom of the receiver 104 and/or the vapor outlet 146 may be disposed on the top of receiver 104 opposite the bottom. Vapor may be supplied from the vapor outlet 146 and/or liquid may be supplied from the liquid outlet 152. Additionally or alternatively, a mix of vapor and liquid may be supplied from the vapor outlet 146 and/or from the liquid outlet 152.

The pump 106 may be any device capable of pumping the cooling fluid from the receiver 104 to the heat load 102. For example, the pump 106 may be a positive displacement pump, a centrifugal pump, and/or any similar type of pump device. The pump 106, may, for example, be a flight pump designed for use in an aircraft at high altitudes, for example, over 30,000 feet. The pump 106, for example, may be designed with a relatively low pressure suction head capability.

The filter 108 may be any device capable of filtering and removing debris and/or contaminates from the cooling fluid. The filter 108 may be a refrigerant 'filter-drier' combination which serves the function of both removing water from the system as well as filtering the fluid. Additionally or alternatively, the filter may be of a mesh screen type with mesh sizes selected to prevent clogging of downstream components within the system.

The pump check valve 110, the TPPL check valve 114, and/or the compressor check valve 124 may be any device capable of allowing flow in only one direction, or preventing flow reversal. For example, the check valves 110, 114, 124 may be a mechanical check valve with a door that closes when the flow of cooling fluid reverses direction. For example, the TPPL check valve 114 may only allow a flow of cooling fluid from the TPPL tee 112 to the heat exchanger 116. Additionally or alternatively, the compressor check valve 124 may only allow a flow of cooling fluid from the compressor 122 to the heat exchanger 116. Additionally or alternatively, the pump check valve 110 may only allow a flow of cooling fluid from the pump 106 to the heat load 102.

The heat load 102 may be any device that cools a load. For example, the heat load 102 may be, for example, a heat exchanger that transfers heat from a target load to the cooling fluid. The heat load 102, for example, may include a heat exchanger, a tube-in-tube heat exchanger, a shell-and-tube heat exchanger, a plate heat exchanger, and/or any similar device. Additionally or alternatively, the heat load 102 may include the target load itself. For example, the heat load 102 may include an LED, a laser, accessory electronics, a generator, an engine, and/or a discrete component configured to thermally couple to the target load. Additionally or alternatively, a cold plate may be thermally coupled to the target load and may have passages through which the cooling fluid flows and evaporates. The heat load 102 may include a single heat load or it could represent a plurality of heat loads distributed in various series and/or parallel arrangements The TPPL tee 112 may be any device that separates the cooling fluid into a liquid and a vapor. The TPPL tee 112 may separate the liquid and the vapor using gravity. For example, the TPPL tee 112 may include, for example, a venturi tube, a venturi scrubber, and/or a T-shaped separator. The T-shaped separator may be, for example, a T-joint. The TPPL tee 112 may include a lower portion of a T-joint that comprises a straight portion connecting the inlet of the TPPL tee 112 to the second outlet 140 of the TPPL tee 112. Additionally, the TPPL tee 112 may include an upper portion of a T-joint that splits off from the straight, lower portion. The upper portion may connect the inlet of the TPPL tee 112 to the first outlet 154 of the TPPL tee 112.

The cooling fluid may flow through the inlet of the TPPL tee 112, and due to gravity, the liquid portion of the cooling fluid may stay in the lower portion of the TPPL tee 112. The liquid may flow from the inlet of the TPPL tee 112, through the lower portion of the TPPL tee 112, through the second outlet 140, through the second control valve 120, and to the first inlet 142 of the receiver 104. Additionally or alternatively, cooling fluid may flow through the inlet of the TPPL tee 112, and the vapor may rise into the upper portion of the TPPL tee 112. The vapor may flow through the inlet of the TPPL tee 112, through the upper portion, through the first outlet 154, and to the TPPL check valve 114.

The first control valve 118, the second control valve 120, the third control valve 126, and/or the fourth control valve 128 may be any type of valve capable of receiving input from the controller 130 and adjusting the volume flow rate and/or mass flow rate of cooling fluid flowing through the control valve. For example, the first control valve 118, the second control valve 120, the third control valve 126, and/or the fourth control valve 128 may be control valves that allow for a variable degree of opening and may be able to increase or decrease the degree of opening of the control valve based on controller 130 feedback. The control valves 118, 120, 126, 128 may be, for example, in-line valves, gate valves, in-line gate valves, manual operated valves, pneumatic valves, motor valves, and/or hydraulic valves.

The heat exchanger 116 may be any device capable of transferring and/or absorbing heat from the cooling fluid. For example, the heat exchanger 116 may transfer heat from the cooling fluid to the ambient environment of the bimodal cooling system 100. The heat exchanger 116 may be, for example, a condenser. The heat exchanger 116 may be, for example, a parallel-flow heat exchanger, a counter flow heat exchanger, a multi-pass flow heat exchanger, and/or a cross flow heat exchanger. The cooling fluid may fill the hot-side channels of the heat exchanger 116 while the ambient environment (for example, air, water, seawater) may fill the cold side channels of the heat exchanger 116.

The compressor 122 may be any device capable of drawing cooling fluid from the receiver 104, compressing the cooling fluid, and pushing the cooling fluid through the VCS loop 138. The compressor 122 may be electrically connected to the controller 130. The controller 103 may control the operation of the compressor 122, for example, turning the compressor 122 on or off, and/or controlling the volume flow rate or mass flow rate of cooling fluid through the compressor 122.

The controller 130 may be any device capable of receiving sensor feedback from the pressure sensors 134 and temperature sensors 132 and transmitting signals to the first control valve 118, the second control valve 120, the third control valve 126, and/or the fourth control valve 128 accordingly. The controller 130 may include, for example, a processor. The controller 130 may, for example, electrically control the control valves 118, 120, 126, 128 based on a target temperature, pressure, and/or flow rate of the bimodal cooling system 100. Examples of the controller 130 may include a processor, programmable logic controller (PLC), a computer, a laptop, a microcontroller, or any other processing device.

During operation, the bimodal cooling system 100 may operate as a two-phase pumped loop (TPPL) and/or as a vapor cycle system (VCS). During TPPL operation, the cooling fluid may flow from the liquid outlet 152 of the receiver 104, downstream to the pump 106, through the filter 108, and through the pump check valve 110. The pump check valve 110 may preclude cooling fluid from flowing through the pump check valve 110 towards the filter 108 and the pump 106. The cooling fluid may flow from the pump check valve 110 to the heat load 102. The heat load 102 may transfer heat, for example, from a target load to the cooling fluid flowing through the heat load 102. The cooling fluid may absorb heat from the target load and/or the heat load 102. As the cooling fluid absorbs heat, at least a portion of the cooling fluid may transform from liquid to vapor.

The cooling fluid may flow from the heat load 102 to the TPPL tee 112. At least a portion of the cooling fluid, including at least a portion the liquid component of the cooling fluid, may flow through the lower portion of the TPPL tee 112, out the second outlet 140 of the TPPL tee 112, through the second control valve 120, and back to the receiver 104 through the first inlet 142. A portion of the vapor component of the cooling fluid may also flow through the second outlet 140 of the TPPL tee 112 and through the second control valve 120. The second control valve 120 may allow at least some vapor to flow through the second control valve 120 in order to control and/or maintain a target temperature at the heat load 102. For example, the second control valve 120 may open or close based on feedback from the pressure sensor 134 and the temperature sensor 132 disposed between the heat load 102 and the TPPL tee 112.

Additionally or alternatively, a portion of the cooling fluid, including at least a portion of the vapor component of the cooling fluid, may flow through the upper portion of the TPPL tee 112, out the first outlet 154 of the TPPL tee 112, through the TPPL check valve 114, and to the heat exchanger 116. The TPPL check valve 114 may preclude cooling fluid from flowing through the TPPL check valve 114 towards the first outlet 154 of the TPPL tee 112, for example, when a pressure at the outlet of the compressor is higher than a pressure upstream of the TPPL check valve 114, between the TPPL check valve 114 and the TPPL tee 112.

The cooling fluid may flow through the heat exchanger 116. The heat exchanger 116 may absorb the heat from the cooling fluid and/or transfer the heat from the cooling fluid to another area or component, for example, to the ambient environment of the bimodal cooling system 100. The heat exchanger 116 may, for example, transfer the heat to the external environment if the bimodal cooling system 100 is disposed, for example, in an aircraft. The cooling fluid may flow from the heat exchanger 116, through the first control valve 118, and to the second inlet 144 of the receiver 104. The first control valve 118, which may also be referred to as a 'subcool control valve', may be adjusted to control the discharge pressure of the compressor 122 and/or to control the cooling capacity of the bimodal cooling system 100. For example, the first control valve 118 may be adjusted to increase or decrease the cooling capacity of the heat exchanger 116 and/or the discharge pressure of the heat exchanger 116 by increasing or decreasing the degree of opening of the first control valve 118. The controller 130 may control the first control valve 118 based on sensor feedback from the pressure sensor 134 and the temperature sensor 132 disposed downstream of the heat exchanger 116, between the heat exchanger 116 and the receiver 104.

The terms "subcool," "subcooling," and "subcooled," as used herein, unless stated otherwise, alone or in combination with other terms, refer to the phenomenon of a liquid at a temperature below its normal boiling point. For example, as understood by a person of ordinary skill, at standard atmospheric pressure, water boils at 373 K. At room temperature, which may refer to approximately 298 K, the water may be referred to as "subcooled."

During operation, a couple of degrees of subcool may be targeted, and the first control valve 118 may be adjusted to maintain the targeted degrees of subcool. Additionally or alternatively, when in TPPL mode, another mode of control may be to command the first control valve 118 to a set position and leave the first control valve 118 in the set position. This may provide, for example, a relatively small level of pressure drop so that the second control valve 120 may be adjusted to control distribution of the cooling fluid flow to/around the heat exchanger 116. By setting the first control valve 118 to a set position, the first control valve 118 and the second control valve 120 are prevented from fighting each other, or in other words, prevented from each trying to correct or continuously re-adjust based on changes in the system 100 due to corrections and adjustments of the other valve. Additionally or alternatively, in VCS mode, the first control valve 118 may operate as a subcool control valve as described above, and the second control valve 120 may be commanded to a fully open position, thus avoiding fighting of the first control valve 118 and the second control valve 120 (correcting and re-adjusting based on changes due to the other valve as described above).

During VCS operation, the cooling fluid may flow from the vapor outlet 146 of the receiver 104 to the compressor 122. The compressor may compress and increase the pressure (and temperature) of the cooling fluid. The cooling fluid may flow from an outlet of the compressor 122 to the recycle line 150, to the bypass line 148, and/or to the compressor check valve 124.

The cooling fluid may flow from the outlet of the compressor 122, to the recycle line 150, through the fourth control valve 128 (also referred to as a superheat control valve), and back upstream of the inlet of the compressor 122, between the inlet of the compressor 122 and the vapor outlet 146 of the receiver 104. The fourth control valve 128 may control the rate of cooling fluid flowing through the recycle line 150. For example, when less cooling is needed for the heat load 102, the compressor 122 and the VCS loop 138 may be turned down. The fourth control valve 128 may be opened and the recycle line 150 may recirculate the cooling fluid from the compressor 122 outlet to the compressor 122 inlet to keep the compressor 122 running and to provide enough vapor when the heat load rejection is not hot enough.

The terms "superheat," "superheating," and "superheated," as used herein, unless stated otherwise, alone or in combination with other terms, refer to the phenomenon in which fluid is heated to a temperature higher than its boiling point. Additionally or alternatively, "superheat" as used herein, unless stated otherwise, alone or in combination with other terms, refers to the excess of temperature of a vapor above its temperature of saturation and/or the extra heat imparted to a vapor in superheating it from a dry and saturated condition.

The vapor at outlet 146 of the receiver 104 may be saturated vapor. There may be two phases present within the receiver 104. Depending on the design of the receiver 104, operating conditions, and/or other factors, there may be some amount of liquid travelling to the compressor 122 on the conduit between the receiver 104 and the compressor 122, which may cause damage to the compressor 122. By adjusting the amount of recycle flow to the inlet of the compressor 122 from the outlet of the compressor 122, a small degree of 'superheat' may be added to the cooling fluid entering the inlet of the compressor 122, which may increase the longevity of the compressor 122. Additionally or alternatively, this may allow a reduction in size or weight of the receiver 104 because lower efficiency separation may be tolerated without adverse consequences to the compressor 122.

Additionally or alternatively, the cooling fluid may flow from the compressor 122 to the bypass line 148, through the third control valve 126 (also referred to as a hot gas bypass valve), and to the second inlet 144 of the receiver 104. The cooling fluid may flow through the third control valve 126 and mix with cooling fluid exiting the heat exchanger 116, before flowing to the receiver 104. The third control valve 126 may control the rate of cooling fluid flowing through the bypass line 148. For example, when the bimodal cooling system 100 is operating in a relatively cold environment, for example, at a relatively high altitude such as over 30,000 feet, the heat exchanger 116 may be capable of providing more cooling capacity than at a lower altitude. When the heat exchanger 116 has an increased cooling capacity, but, for example, the heat load 102 still requires a larger amount of cooling than is capable during TPPL operation, the bypass line 148 may provide cooling fluid discharged from the compressor 122 back upstream of the receiver 104 to prevent overcooling of the cooling fluid in the receiver 104.

Additionally or alternatively, the third control valve 126 may be used when the cooling required by the heat load 102 is relatively low, but the ambient temperature is high enough that sub-ambient cooling (for example, sub-ambient cooling from the VCS) is required. In this case, the system 100 may run the compressor 122 to get the sub ambient cooling, but the minimum capacity of the compressor 122 may be too high for the heat load 102. In such a scenario, the third control valve 126 may be adjusted to control the cooling capacity of the system 100.

Additionally or alternatively, the cooling fluid may flow from the compressor 122 to the compressor check valve 124. The compressor check valve 124 may preclude cooling fluid from flowing through the compressor check valve 124 towards the compressor 122, for example, when a pressure at the outlet of the compressor 122 is lower than a pressure upstream of the TPPL check valve 114, between the TPPL check valve 114 and the TPPL tee 112.

Cooling fluid may flow from the compressor 122, through the compressor check valve 124, and through the heat exchanger 116. The heat exchanger 116 may absorb the heat from the cooling fluid and/or transfer the heat from the cooling fluid to another area or component, for example, to the ambient environment of the bimodal cooling system 100. The heat exchanger 116 may, for example, transfer the heat to the external environment if the bimodal cooling system 100 is disposed, for example, in an aircraft. The heat exchanger 116 may absorb heat from the cooling fluid. As the heat exchanger 116 absorbs heat, at least a portion of the cooling fluid may condense from a vapor to a liquid.

The cooling fluid may flow from the heat exchanger 116, through the first control valve 118, and to the second inlet 144 of the receiver 104. The first control valve 118 may be adjusted to control the discharge pressure of the compressor 122 and/or to control the cooling capacity of the bimodal cooling system 100. For example, the first control valve 118 may be adjusted to increase or decrease the cooling capacity and/or the discharge pressure by increasing or decreasing the degree of opening of the first control valve 118. The controller 130 may control the first control valve 118 based on sensor feedback from the pressure sensor 134 and the temperature sensor 132 disposed downstream of the heat exchanger 116, between the heat exchanger 116 and the receiver 104. The first control valve 118 may be adjusted to increases pressure and/or increase the saturation temperature of the cooling fluid, for example, during VCS operation.

During VCS operation, the cooling fluid may flow from the liquid outlet 152 of the receiver 104, through the pump 106, through the filter 108, and/or through the heat load 102 as describe above during TPPL operation. Additionally or alternatively, when the bimodal cooling system 100 operates as a vapor cycle system, the TPPL check valve 114 may close, and all of the cooling fluid may flow through the second outlet 140 of the TPPL tee 112 and through the second control valve 120 to the receiver 104. Additionally or alternatively, the second control valve 120 may simultaneously begin to open while the TPPL check valve 114 begins to close so as to not overly backpressure the pump 106 and avoid chattering of the second control valve and the TPPL check valve 114.

The bimodal cooling system 100 may transition from TPPL operation to VCS operation when an increase in cooling capacity is needed to adequately cool the heat load 102 and/or when increased heat rejection is required, for example, when the difference between the ambient air temperature and the temperature of the heat load 102 (Δt) is relatively low or negative. For example, the heat exchanger 116 may not be able to reject as much heat as is needed to adequately cool the heat load 102 during TPPL operation when the bimodal cooling system 100 is operating at a relatively lower altitude where the temperature of the ambient air is relatively warmer, and/or when the heat load 102 is relatively high, for example, when the bimodal cooling system 100 is disposed in an aircraft, during take-off or operation of the target load.

Based on feedback from the pressure sensors 134 and/or the temperature sensors 132, and based on target temperatures of the heat load 102 and/or the receiver 104, the controller 130 may determine an increase in cooling capacity is needed, for example, when one or more of the temperature sensors 132 detect a temperature higher than the target temperature at the area of the sensor 132, and in response, the controller 130 may turn on the compressor 122. As the compressor 122 begins to operate, drawing cooling fluid from the receiver 104, compressing the cooling fluid, and raising the temperature and pressure of the cooling fluid, the pressure at the outlet of the compressor 122 may increase. The pressure at the outlet of the compressor 122 may become larger than a pressure upstream of the TPPL check valve 114. As a result, the compressor check valve 124 may open and the TPPL check valve 114 may close.

Additionally or alternatively, the bimodal cooling system 100 may transition from VCS operation to TPPL operation when the cooling capacity needed to adequately cool the heat load 102 decreases and/or when decreased heat rejection is required, for example, when the difference between the ambient environment (for example, air) temperature and the temperature of the heat load 102 (Δt) is relatively high. For example, the heat exchanger 116 may be able to reject an amount of heat to adequately cool the heat load 102 during TPPL operation when the bimodal cooling system 100 is operating at a relatively higher altitude where the temperature of the ambient air is relatively low, and/or when the heat load 102 is relatively low, for example, when the bimodal cooling system 100 is disposed in an aircraft, during cruise or when the target load is inactive.

Figure 2:
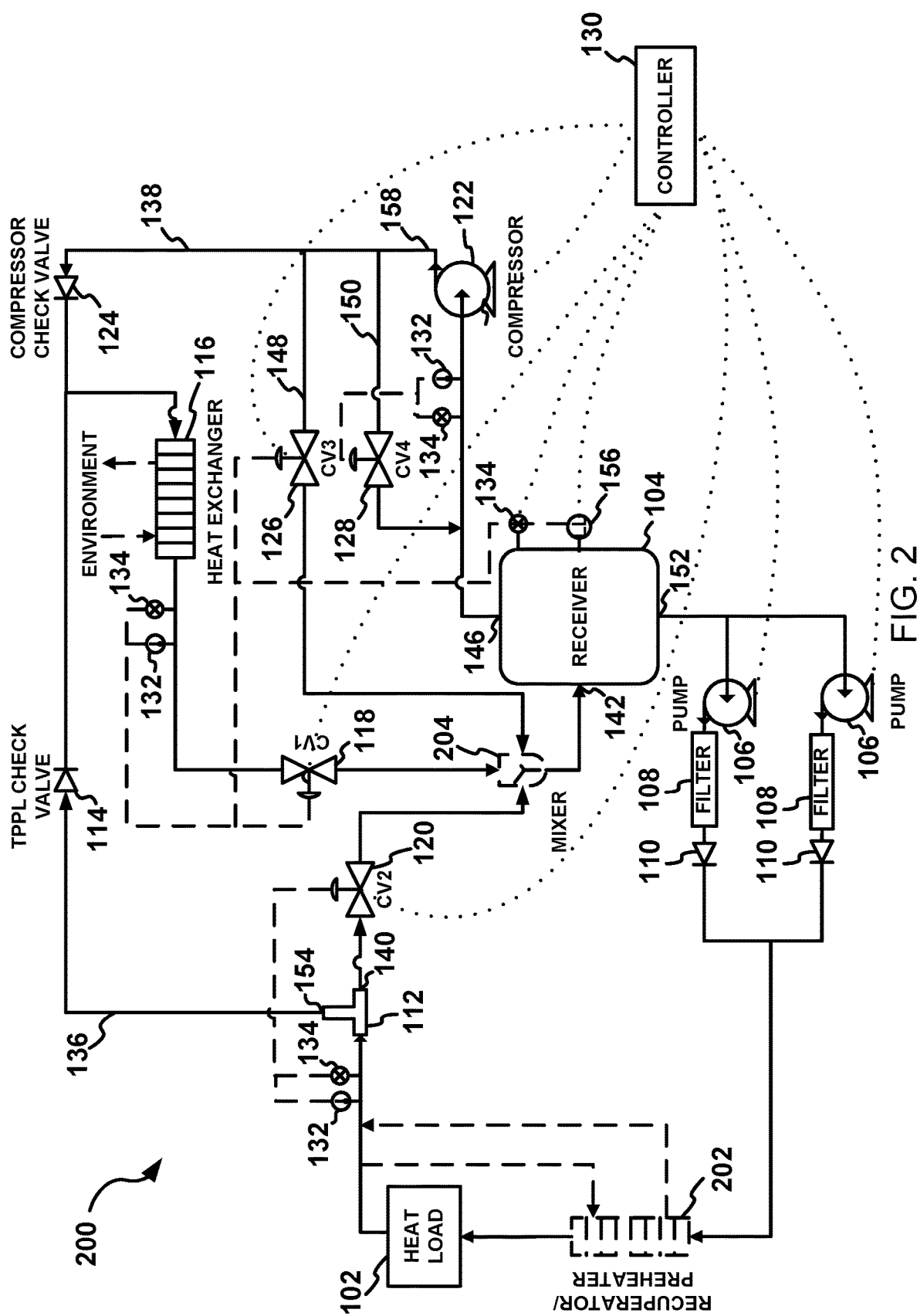
FIG. 2 illustrates a second example of a bimodal cooling system.

FIG. 2 illustrates an example of a bimodal cooling system 200. All features and functionality discussed with reference to FIG. 1 are applicable to the following embodiments and examples unless otherwise indicated. The bimodal cooling system 200 may include all of the components of bimodal cooling system 100. The bimodal cooling system 200 may include one or more pumps 106, one or more filters 108, one or more pump check valves, a preheater 202, and/or a mixer 204.

Multiple pumps 106 may be disposed downstream of the receiver 104. The liquid outlet 152 of the liquid vapor separator may provide cooling fluid from the receiver 104 to the multiple pumps 106. The pumps 106 may be in parallel with each other. Each pump 106 may have a filter 108 and/or a pump check valve 110 disposed downstream of the pump 106. During operation, cooling fluid may flow from the receiver 104 and split between different cooling lines downstream of the receiver 104, wherein each one of the cooling lines includes one of the pumps 106, one of the filters 108, and one of the pump check valves 110. The parallel cooling lines may then merge back together into a single line downstream of the pump check valves 110, between the pump check valves 110 and the preheater 202 and/or the heat load 102.

The preheater 202 may be disposed downstream of the pump check valves 110, filters 108, and/or pumps 106 and upstream of the heat load 102. Cooling fluid may flow from the pumps 106 to through the preheater 202 and to the heat load 102. The preheater 202 may be any device capable of transferring heat to the cooling fluid upstream of the heat load 102, for example, the preheater 202 may be a recuperator and/or a tube in tube heat exchanger. A cooling fluid line may extend from downstream of the heat load 102, between the heat load 102 and the TPPL tee 112, to the preheater 202, through the preheater 202, and back downstream of the heat load 102.

During operation, cooling fluid may flow from the pumps 106, though the preheater 202, and to the heat load 102. The preheater 202 may pass cooling fluid flowing from the pump 106 in close proximity to the flow of cooling fluid from downstream of the heat load 102 to transfer heat to the flow of cooling fluid flowing from the pump 106. Preheating the cooling fluid flowing from the pump 106 before flowing to the heat load 102 may increase the efficiency of the bimodal cooling system 100.

The mixer 204 may be disposed downstream of the first control valve 118, the second control valve 120, and/or the third control valve 126. The mixer may be disposed upstream of the first inlet 142 of the receiver 104. The mixer may be any device capable of receiving a flow of cooling fluid from the first control valve 118, the second control valve 120, and/or the third control valve 126, and mixing the separate flows from each respective control valve 118, 120, 126 into a single flow. During operation, cooling fluid may flow to the mixer 204 from the heat load through the second control valve 120, to the mixer 204 from the heat exchanger 116 through the first control valve 118, and/or to the mixer 204 from the compressor 122 through the third control valve 126. The cooling fluid may be mixed in the mixer 204 and flow through an outlet of the mixer 204 to the first inlet 142 of the receiver 104.

The mixer 204 may enable improved average pressure and/or temperature sensing to be used for control, improve controllability of the compressor 122 during turndown conditions, and/or reduce the size and/or weight of the receiver 104 by limiting the number of higher stress ports on a larger diameter vessel. The mixer 204 may improve the compressor 122 control during turndown by avoiding a thermal runaway condition. A thermal runaway condition may occur when the hot gas from the third control valve 126 travels in a loop through the receiver 104 and back to the compressor 122 without being adequately cooled via latent heat absorption from vaporizing some of the liquid phase of the cooling fluid.

Figure 3:
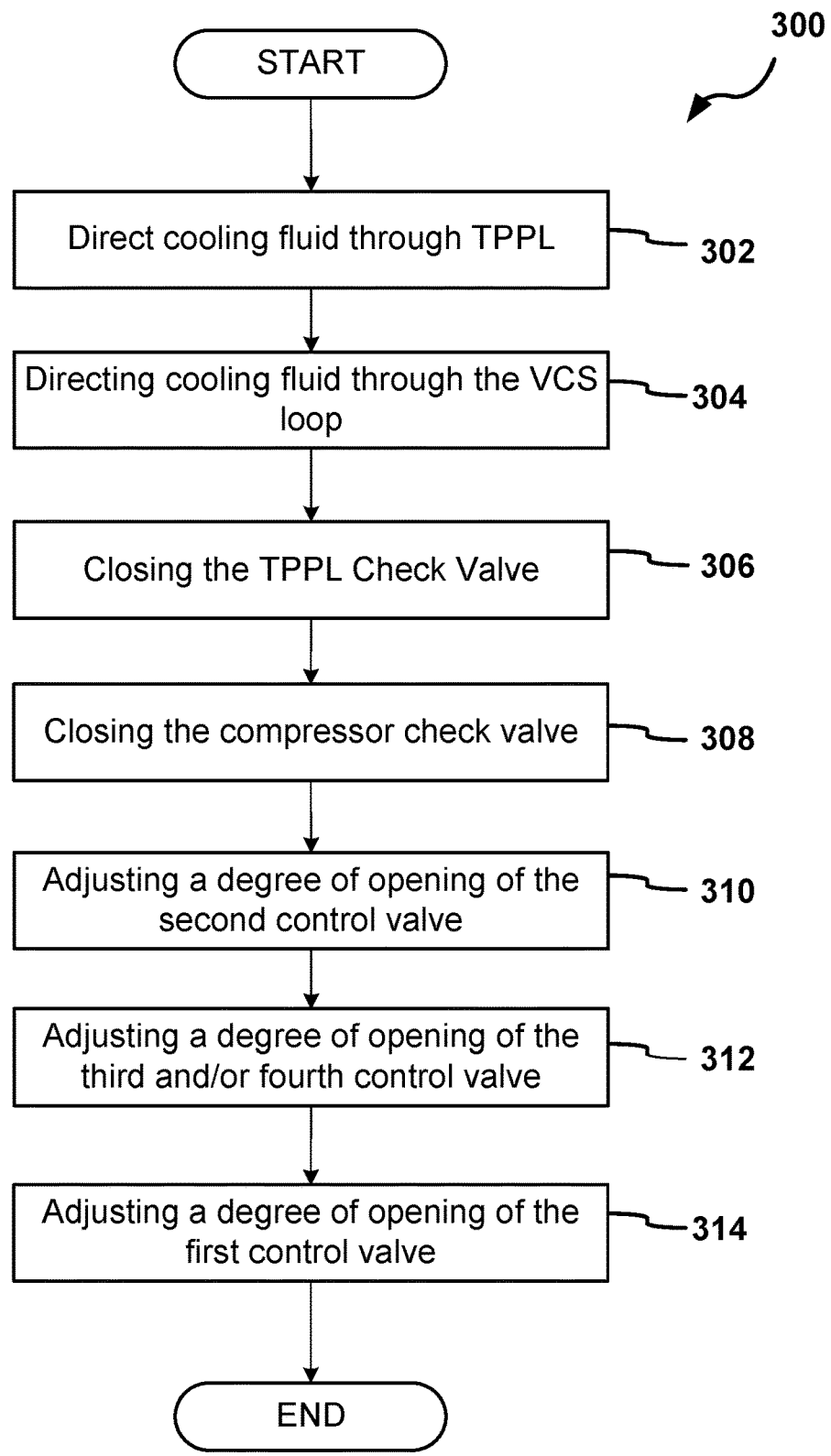
FIG. 3 illustrates a block diagram of an example of a bimodal cooling system.

FIG. 3 illustrates a flow diagram of an example sequences of steps (300) to cool the heat load 102. The steps may include additional, different, or fewer operations than illustrated in FIG. 3. The steps may be executed in a different order than illustrated in FIG. 3.

During operation of the bimodal cooling system 100, 200, cooling fluid may be directed (302) through the TPPL 136 if the TPPL check valve 114 is open and the compressor check valve 124 is closed. The TPPL may include the receiver 104, the heat load 102 downstream from the receiver 104, the TPPL tee 112 downstream from the heat load 102, the TPPL check valve 114 downstream from the TPPL tee 112, and the heat exchanger 116 downstream from the TPPL check valve 114 and upstream from the receiver.

The cooling fluid may be directed (304) through a vapor cycle system (VCS) loop 138 if the compressor check valve 124 is open and the TPPL check valve is 114 closed. The vapor cycle system loop 138 may include the receiver 104, the 122 compressor downstream from the receiver 104, the compressor check valve 124 downstream from the compressor 122 and upstream of the heat exchanger 116, and the heat exchanger 116.

The TPPL check valve 114 may be closed (306) if a discharge pressure of the compressor 122 is higher than a pressure of the two-phase pumped loop 136 upstream of the TPPL check valve 114.

The compressor check valve 124 may be closed (308) if a pressure at an inlet of the heat exchanger 116 is higher than a pressure at an outlet of the compressor 122.

A degree of opening of the second control valve 120 disposed downstream from the TPPL tee 112 may be adjusted (310) based on feedback from the pressure sensor 134 and/or the temperature sensor 132. The pressure sensor 134 and/or the temperature sensor 132 may be disposed upstream of the TPPL tee 112. Additionally or alternatively, a degree of opening of the second control valve 120 may be adjusted (310) based on the pressure and/or temperature of the receiver 104, which may be measured by using the instrumentation upstream of the compressor 122 when the compressor 122 is off.

A degree of opening of the third control valve 126 and/or the fourth control valve 128 disposed downstream from the compressor may be adjusted (312) based on feedback from the pressure sensor 134 and/or the temperature sensor 132. The pressure sensor 134 and/or the temperature sensor 132 may be disposed upstream of the compressor.

A degree of opening of the first control valve 118 disposed downstream from the heat exchanger may be adjusted (314) based on feedback from the pressure sensor 134 and/or the temperature sensor 132. The pressure sensor 134 and/or the temperature sensor 132 may be disposed downstream of the heat exchanger 116.

The logic illustrated in the flow diagrams may include additional, different, or fewer operations than illustrated. The operations illustrated may be performed in an order different than illustrated.

The steps may include additional, different, or fewer steps than illustrated in FIG. 3. The steps may be executed in a different order than illustrated in FIG. 3. For example the step of closing (308) the compressor check valve 124 may come before the step of directing (302) cooling fluid through the TPPL 136. Alternatively or additionally, the step of closing (306) the TPPL check valve 114 may come before the step of directing (3004) cooling fluid through the VCS loop 138. Alternatively or additionally, the step of adjusting (310, 312, 314) the first control valve 118, the second control valve 120, the third control valve 126, and/or the fourth control valve 128 may occur before or after any one of the other steps. Alternatively or additionally, any one of the steps illustrated in FIG. 3 may occur multiple times and/or in any order.

Although the flow chart in FIG. 3 may appear to imply that the steps illustrated are performed in series, any of the steps illustrated in FIG. 3 may be performed simultaneously. For example, of directing (302) cooling fluid through the TPPL 136 may occur while closing (308) the compressor check valve 124 or while adjusting (310, 312, 314) the first control valve 118, the second control valve 120, the third control valve 126, and/or the fourth control valve 128.

Each component may include additional, different, or fewer components. For example the heat load 102 may include an evaporator, a cold plate, a rectifier flow control valve, and/or a subscale cold plate. Additionally or alternatively, the compressor 122 may include multiple compressors, a filter, a drier, and/or a boost pump.

The bimodal cooling system 100, 200 may be implemented with additional, different, or fewer components. For example, the bimodal cooling system may include multiple heat loads 102, multiple check valves 110, 114, 124, multiple heat exchangers 116, multiple pumps 106, multiple control valves 120, 118, 126, 128, and multiple pressure sensors 134 and/or temperature sensors 132. The bimodal cooling system 100, 200 may include other types of sensors, for example, mass flow rate sensors and/or liquid level sensors. The bimodal cooling system 100, 200 may include a subcooler upstream of the pump 106, between the pump 106 and the receiver 104, to add cooling and/or avoid cavitation at the pump 106.

Additionally, or alternatively, the controller 130 may include a memory (not shown), a processor (not shown), and a network interface (not shown). The processor may be in communication with the memory and a network interface. The processor and other components of the bimodal cooling system 100, 200 may be in communication with each other. For example, the first control valve 118, the second control valve 120, the third control valve 126, the fourth control valve 128, the receiver 104, the pressure sensors 134, and/or temperature sensors 132 may be in communication with the processor. Additionally or alternative, the processor may be in communication with one or more sensors. The sensors may be, for example, pressure sensors, flow sensors, and/or temperature sensors. There may be, for example, optical and/or electrical connections between the controller 130 and each one of the components of the bimodal cooling system 100, 200 by which the processor and one or more of the components communicate.

In one example, the processor may also be in communication with additional elements, such as a display. Examples of the processor may include a general processor, a central processing unit, a microcontroller, a server, an application specific integrated circuit (ASIC), a digital signal processor, a field programmable gate array (FPGA), a controller, a PLC, and/or a digital circuit, analog circuit.

The processor may be one or more devices operable to execute logic. The logic may include computer executable instructions or computer code embodied in the memory or in other memory that when executed by the processor, cause the processor to perform the features implemented by the logic. The computer code may include instructions executable with the processor.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a cooling system comprising: a two-phase pumped loop (TPPL), the two-phase pumped loop including a receiver, a pump downstream from the receiver, a heat load downstream from the pump, a TPPL check valve downstream from the heat load, and a heat exchanger downstream from the TPPL check valve and upstream from the receiver; and a vapor cycle system (VCS) loop, the vapor cycle system loop including the receiver, a compressor downstream from a vapor outlet of the receiver, a compressor check valve downstream from the compressor and upstream of the heat exchanger, and the heat exchanger, wherein the heat load, which is in the TPPL, is in the VCS loop downstream from a liquid outlet of the receiver, wherein the two-phase pumped loop is configured to operate in a TPPL mode in which a cooling fluid flows through the two-phase pumped loop due to the TPPL check valve being open and the compressor check valve being closed, and wherein the vapor cycle system loop is configured to operate in a VCS mode in which the cooling fluid flows through the vapor cycle system loop due to the TPPL check valve being closed and the compressor check valve being open.

A second aspect relates to the cooling system of aspect 1, wherein the TPPL further includes a TPPL tee downstream from the heat load, wherein the TPPL check valve is downstream of the TPPL tee.

A third aspect relates to the cooling system of any preceding aspect, wherein the compressor check valve is configured to close if a pressure at an inlet of the heat exchanger is higher than a pressure at an outlet of the compressor and/or wherein the TPPL check valve is configured to close if a pressure at an outlet of the compressor is higher than a pressure of the two-phase pumped loop upstream of the TPPL check valve.

A fourth aspect relates to the cooling system of any preceding aspect, further comprising a cooling line extending from an outlet of the TPPL tee to the receiver, wherein the cooling line comprises a control valve downstream the TPPL tee and upstream of the receiver.

A fifth aspect relates to the cooling system of any preceding aspect, further comprising a pressure sensor and/or a temperature sensor disposed upstream of the TPPL tee, and a controller, wherein the controller is configured to adjust a degree of opening of the control valve based on feedback from the pressure sensor and/or the temperature sensor, wherein a temperature of the heat load is affected by the degree of opening of the control valve.

A sixth aspect relates to the cooling system of any preceding aspect, further comprising a recycle line extending from an outlet of the compressor back upstream to an inlet of the compressor, wherein the recycle line comprises a control valve downstream from the compressor, wherein the recycle line is configured to recirculate the cooling fluid from the outlet of the compressor to the inlet of the compressor to heat the cooling fluid at the inlet of the compressor.

A seventh aspect relates to the cooling system of any preceding aspect, further comprising a pressure sensor and/or a temperature sensor disposed upstream of the compressor, and a controller, wherein the controller is configured to adjust a degree of opening of the control valve based on feedback from the pressure sensor and/or the temperature sensor.

An eighth aspect relates to the cooling system of any preceding aspect, further comprising a bypass line extending from an outlet of the compressor to an inlet of the receiver, wherein the bypass line comprises a control valve disposed downstream from the compressor.

A ninth aspect relates to the cooling system of any preceding aspect, further comprising a pressure sensor and/or a temperature sensor upstream of the compressor, and a controller, wherein the controller is configured to adjust a degree of opening of the control valve based on feedback from the pressure sensor and/or the temperature sensor, wherein the bypass line is configured to recirculate the cooling fluid from the outlet of the compressor to the receiver to heat the cooling fluid in the receiver.

A tenth aspect relates to the cooling system of any preceding aspect, further comprising a control valve downstream the heat exchanger and upstream of the receiver, a pressure sensor and/or a temperature sensor downstream from the heat exchanger, and a controller, wherein the controller is configured to adjust a degree of opening of the control valve based on feedback from the pressure sensor and/or the temperature sensor.

An eleventh aspect relates to the cooling system of any preceding aspect, further comprising a mixer disposed upstream of the receiver and downstream from the heat load, the compressor, and the heat exchanger.

A twelfth aspect relates to the cooling system of any preceding aspect, wherein the TPPL tee is a T-shaped separator.

A thirteenth aspect relates to the cooling system of any preceding aspect, further comprising a preheater upstream of the heat load and downstream from the pump, wherein the preheater is configured to preheat the cooling fluid entering the heat load by transferring heat from the cooling fluid exiting the heat load.

A fourteenth aspect relates to a method of cooling a heat load, the method comprising: directing a cooling fluid through a two-phase pumped loop (TPPL) in a TPPL mode due to a TPPL check valve being open and a compressor check valve being closed, the two-phase pumped loop including a receiver, a heat load downstream from the receiver, the TPPL check valve downstream from the heat load, and a heat exchanger downstream from the TPPL check valve and upstream from the receiver; directing the cooling fluid through a vapor cycle system (VCS) loop in VCS mode due to the TPPL check valve being closed and the compressor check valve being open, the vapor cycle system loop including the receiver, a compressor downstream from a vapor outlet of the receiver, the compressor check valve downstream from the compressor and upstream of the heat exchanger, and the heat exchanger, wherein the heat load, which is in the TPPL, is in the VCS loop downstream from a liquid outlet of the receiver.

A fifteenth aspect relates to the method of aspect 14, further comprising closing the TPPL check valve if a discharge pressure of the compressor is higher than a pressure of the two-phase pumped loop upstream of the TPPL check valve when the cooling capacity of the TPPL is insufficient to cool the heat load.

A sixteenth method relates to the method of any preceding aspect, further comprising closing the compressor check valve if a pressure at an inlet of the heat exchanger is higher than a pressure at an outlet of the compressor when the cooling capacity of the TPPL is sufficient to cool the heat load.

A seventeenth aspect relates to the method of any preceding aspect, wherein the TPPL further includes a TPPL tee downstream from the heat load, wherein the TPPL check valve is downstream of the TPPL tee, the method further comprising adjusting a degree of opening of a control valve disposed downstream from the TPPL tee based on feedback from a pressure sensor and/or a temperature sensor, wherein the pressure sensor and/or the temperature sensor is disposed upstream of the TPPL tee.

An eighteenth aspect relates to the method of any preceding aspect, further comprising adjusting a degree of opening of a control valve disposed downstream from the compressor based on feedback from a pressure sensor and/or a temperature sensor, wherein the pressure sensor and/or the temperature sensor is disposed upstream of the compressor.

A nineteenth aspect relates to the method of any preceding aspect, further comprising adjusting a degree of opening of a control valve disposed downstream from the heat exchanger based on feedback from a pressure sensor and/or a temperature sensor, wherein the pressure sensor and/or the temperature sensor is disposed downstream of the heat exchanger.

A twentieth aspect relates to a cooling system comprising: a two-phase pumped loop (TPPL), the two-phase pumped loop including a receiver, a pump downstream from the receiver, a heat load downstream from the pump, a TPPL tee downstream from the heat load, a TPPL check valve downstream from the TPPL tee, and a heat exchanger downstream from the TPPL check valve and upstream from the receiver; and a vapor cycle system (VCS) loop, the vapor cycle system loop including the receiver, a compressor downstream from a vapor outlet of the receiver, a compressor check valve downstream from the compressor and upstream of the heat exchanger, and the heat exchanger, wherein the heat load, which is in the TPPL, is in the VCS loop downstream from a liquid outlet of the receiver, wherein the two-phase pumped loop is configured to operate in a TPPL mode in which a cooling fluid flows through the two-phase pumped loop due to the TPPL check valve being open and the compressor check valve being closed, and wherein the vapor cycle system loop is configured to operate in a VCS mode in which the cooling fluid flows through the vapor cycle system loop due to the TPPL check valve being closed and the compressor check valve being open, wherein the TPPL check valve is configured to close if, in response to the compressor being turned on, a pressure at an outlet of the compressor is higher than a pressure of the two-phase pumped loop upstream of the TPPL check valve, wherein the compressor check valve is configured to close if, in response to the compressor being turned off, a pressure at an inlet of the heat exchanger is higher than a pressure at an outlet of the compressor.

In addition to the features mentioned in each of the independent aspects enumerated above, some examples may show, alone or in combination, the optional features mentioned in the dependent aspects and/or as disclosed in the description above and shown in the figures.

What is claimed is:

1. A cooling system comprising:
    a two-phase pumped loop (TPPL), the two-phase pumped loop including
        a receiver,
        a pump downstream from the receiver,
        a heat load downstream from the pump,
        a TPPL check valve downstream from the heat load,
        a TPPL tee to separate a liquid portion of a cooling fluid from a vapor portion of the cooling fluid, and
        a heat exchanger downstream from the TPPL check valve and upstream from the receiver; and
    a vapor cycle system (VCS) loop, the vapor cycle system loop including
        the receiver,
        a compressor downstream from a vapor outlet of the receiver,
        a compressor check valve downstream from the compressor and upstream of the heat exchanger, and
        the heat exchanger,
    wherein the heat load, which is in the TPPL, is in the VCS loop downstream from a liquid outlet of the receiver,
    wherein the two-phase pumped loop is configured to operate in a TPPL mode in which the cooling fluid flows through the two-phase pumped loop due to the TPPL check valve being open and the compressor check valve being closed, and wherein the vapor cycle system loop is configured to operate in a VCS mode in which the cooling fluid flows through the vapor cycle system loop due to the TPPL check valve being closed and the compressor check valve being open,
    wherein the TPPL check valve is configured to close in response to a pressure at an outlet of the compressor being higher than a pressure of the two-phase pumped loop upstream of the TPPL check valve.

2. The cooling system of claim 1 wherein the TPPL tee is downstream from the heat load, wherein the TPPL check valve is downstream of the TPPL tee.

3. The cooling system of claim 1 wherein the compressor check valve is configured to close in response to a pressure at an inlet of the heat exchanger being higher than a pressure at an outlet of the compressor.

4. The cooling system of claim 2 further comprising a cooling line extending from an outlet of the TPPL tee to the receiver, wherein the cooling line comprises a control valve downstream the TPPL tee and upstream of the receiver.

5. The cooling system of claim 4 further comprising a pressure sensor and/or a temperature sensor disposed upstream of the TPPL tee, and a controller, wherein the controller is configured to adjust a degree of opening of the control valve based on feedback from the pressure sensor and/or the temperature sensor, wherein a temperature of the heat load is affected by the degree of opening of the control valve.

6. The cooling system of claim 1 further comprising a recycle line extending from an outlet of the compressor back upstream to an inlet of the compressor, wherein the recycle line comprises a control valve downstream from the compressor, wherein the recycle line is configured to recirculate the cooling fluid from the outlet of the compressor to the inlet of the compressor to heat the cooling fluid at the inlet of the compressor.

7. The cooling system of claim 6 further comprising a pressure sensor and/or a temperature sensor disposed upstream of the compressor, and a controller, wherein the controller is configured to adjust a degree of opening of the control valve based on feedback from the pressure sensor and/or the temperature sensor.

8. The cooling system of claim 1 further comprising a bypass line extending from an outlet of the compressor to an inlet of the receiver, wherein the bypass line comprises a control valve disposed downstream from the compressor.

9. The cooling system of claim 8 further comprising a pressure sensor and/or a temperature sensor upstream of the compressor, and a controller, wherein the controller is configured to adjust a degree of opening of the control valve based on feedback from the pressure sensor and/or the temperature sensor, wherein the bypass line is configured to recirculate the cooling fluid from the outlet of the compressor to the receiver to heat the cooling fluid in the receiver.

10. The cooling system of claim 1 further comprising a control valve downstream the heat exchanger and upstream of the receiver, a pressure sensor and/or a temperature sensor downstream from the heat exchanger, and a controller, wherein the controller is configured to adjust a degree of opening of the control valve based on feedback from the pressure sensor and/or the temperature sensor.

11. The cooling system of claim 1 further comprising a mixer disposed upstream of the receiver and downstream from the heat load, the compressor, and the heat exchanger.

12. The cooling system of claim 2 wherein the TPPL tee is a T-shaped separator shaped to separate the liquid portion of a cooling fluid from the vapor portion of the cooling fluid through gravity.

13. The cooling system of claim 1 further comprising a preheater upstream of the heat load and downstream from the pump, wherein the preheater is configured to preheat the cooling fluid entering the heat load by transferring heat from the cooling fluid exiting the heat load.

14. A method of cooling a heat load, the method comprising:
    directing a cooling fluid through a two-phase pumped loop (TPPL) in a TPPL mode due to a TPPL check valve being open and a compressor check valve being closed, the two-phase pumped loop including
        a receiver,
        a heat load downstream from the receiver,
        a mixer downstream from the heat load and upstream of the receiver,
        the TPPL check valve downstream from the heat load, and
        a heat exchanger downstream from the TPPL check valve and upstream from the receiver;
    directing the cooling fluid through a vapor cycle system (VCS) loop in VCS mode due to the TPPL check valve being closed and the compressor check valve being open, the vapor cycle system loop including
        the receiver,
        a compressor downstream from a vapor outlet of the receiver,
        the compressor check valve downstream from the compressor and upstream of the heat exchanger,
        the heat exchanger, and
        the mixer downstream from the heat exchanger and upstream from receiver, an output of the heat load in fluid communication with a first inlet of the mixer and an output of the heat exchanger in fluid communication with a second inlet of the mixer,
wherein the heat load, which is in the TPPL, is in the VCS loop downstream from a liquid outlet of the receiver; and
closing the TPPL check valve if a discharge pressure of the compressor is higher than a pressure of the two-phase pumped loop upstream of the TPPL check valve when the cooling capacity of the TPPL is insufficient to cool the heat load.

15. The method of claim 14 further comprising closing the compressor check valve if a pressure at an inlet of the heat exchanger is higher than a pressure at an outlet of the compressor when the cooling capacity of the TPPL is sufficient to cool the heat load.

16. The method of claim 14, wherein the TPPL further includes a TPPL tee downstream from the heat load, wherein the TPPL check valve is downstream of the TPPL tee, the method further comprising adjusting a degree of opening of a control valve disposed downstream from the TPPL tee based on feedback from a pressure sensor and/or a temperature sensor, wherein the pressure sensor and/or the temperature sensor is disposed upstream of the TPPL tee.

17. The method of claim 14 further comprising adjusting a degree of opening of a control valve disposed downstream from the compressor based on feedback from a pressure sensor and/or a temperature sensor, wherein the pressure sensor and/or the temperature sensor is disposed upstream of the compressor.

18. The method of claim 14 further comprising adjusting a degree of opening of a control valve disposed downstream from the heat exchanger based on feedback from a pressure sensor and/or a temperature sensor, wherein the pressure sensor and/or the temperature sensor is disposed downstream of the heat exchanger.

19. A cooling system comprising:
a two-phase pumped loop (TPPL), the two-phase pumped loop including
a receiver,
a pump downstream from the receiver,
a heat load downstream from the pump,
a TPPL tee downstream from the heat load, the TPPL tee comprising a T-shaped separator to separate a liquid portion of a cooling fluid from a vapor portion of the cooling fluid through gravity,
a TPPL check valve downstream from the TPPL tee, and
a heat exchanger downstream from the TPPL check valve and upstream from the receiver; and
a vapor cycle system (VCS) loop, the vapor cycle system loop including
the receiver,
a compressor downstream from a vapor outlet of the receiver,
a compressor check valve downstream from the compressor and upstream of the heat exchanger, and
the heat exchanger,
wherein the heat load, which is in the TPPL, is in the VCS loop downstream from a liquid outlet of the receiver,
wherein the two-phase pumped loop is configured to operate in a TPPL mode in which the cooling fluid flows through the two-phase pumped loop due to the TPPL check valve being open and the compressor check valve being closed, and wherein the vapor cycle system loop is configured to operate in a VCS mode in which the cooling fluid flows through the vapor cycle system loop due to the TPPL check valve being closed and the compressor check valve being open,
wherein the TPPL check valve is configured to close if, in response to the compressor being turned on, a pressure at an outlet of the compressor is higher than a pressure of the two-phase pumped loop upstream of the TPPL check valve,
wherein the compressor check valve is configured to close if, in response to the compressor being turned off, a pressure at an inlet of the heat exchanger is higher than a pressure at an outlet of the compressor.

20. The cooling system of claim 11 wherein an output of the heat exchanger, an output of the heat load, and an output of the compressor are coupled to the mixer, and an output of the mixer is coupled to the receiver.

* * * * *